Oct. 7, 1969
L. BALAMUTH
3,471,724
MAGNETOSTRICTIVE VIBRATOR FOR HIGH FREQUENCY MACHINING OF HARD MATERIALS
Filed April 8, 1965
4 Sheets-Sheet 1
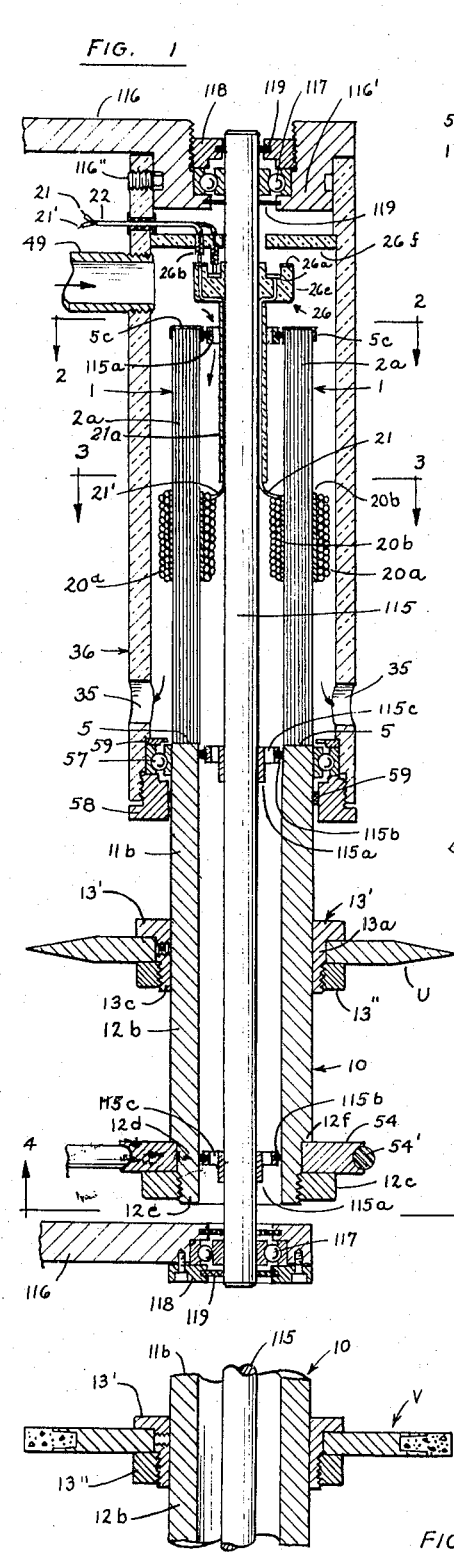
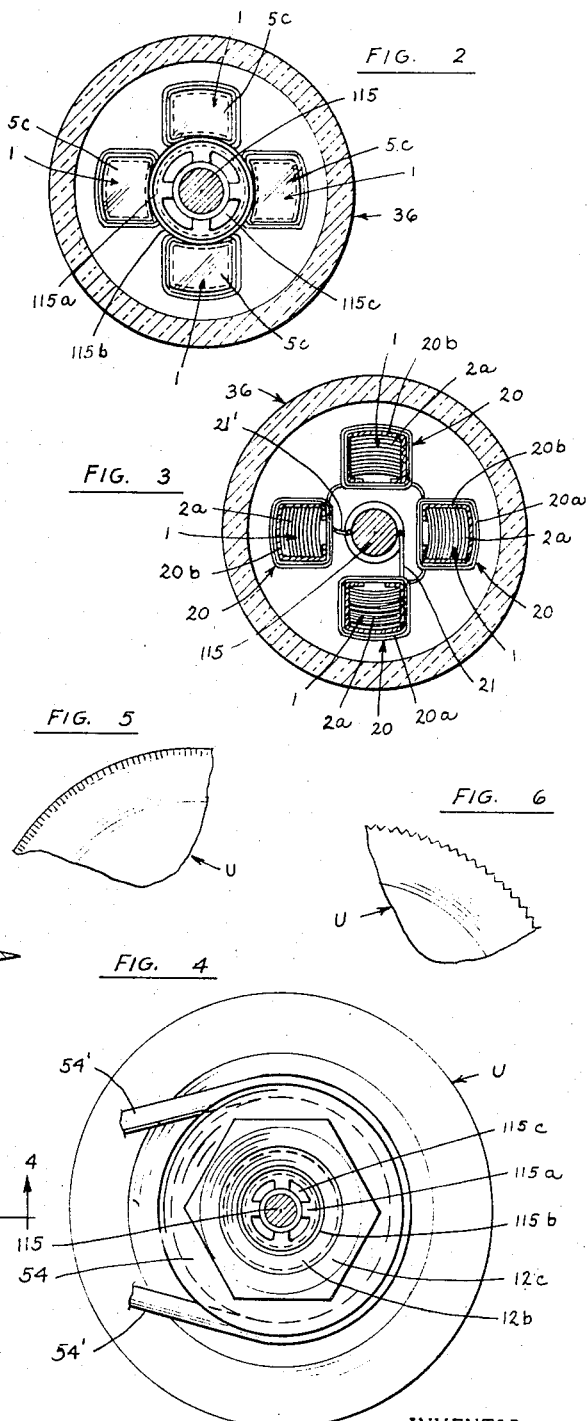
INVENTOR
LEWIS BALAMUTH
BY
ATTORNEY

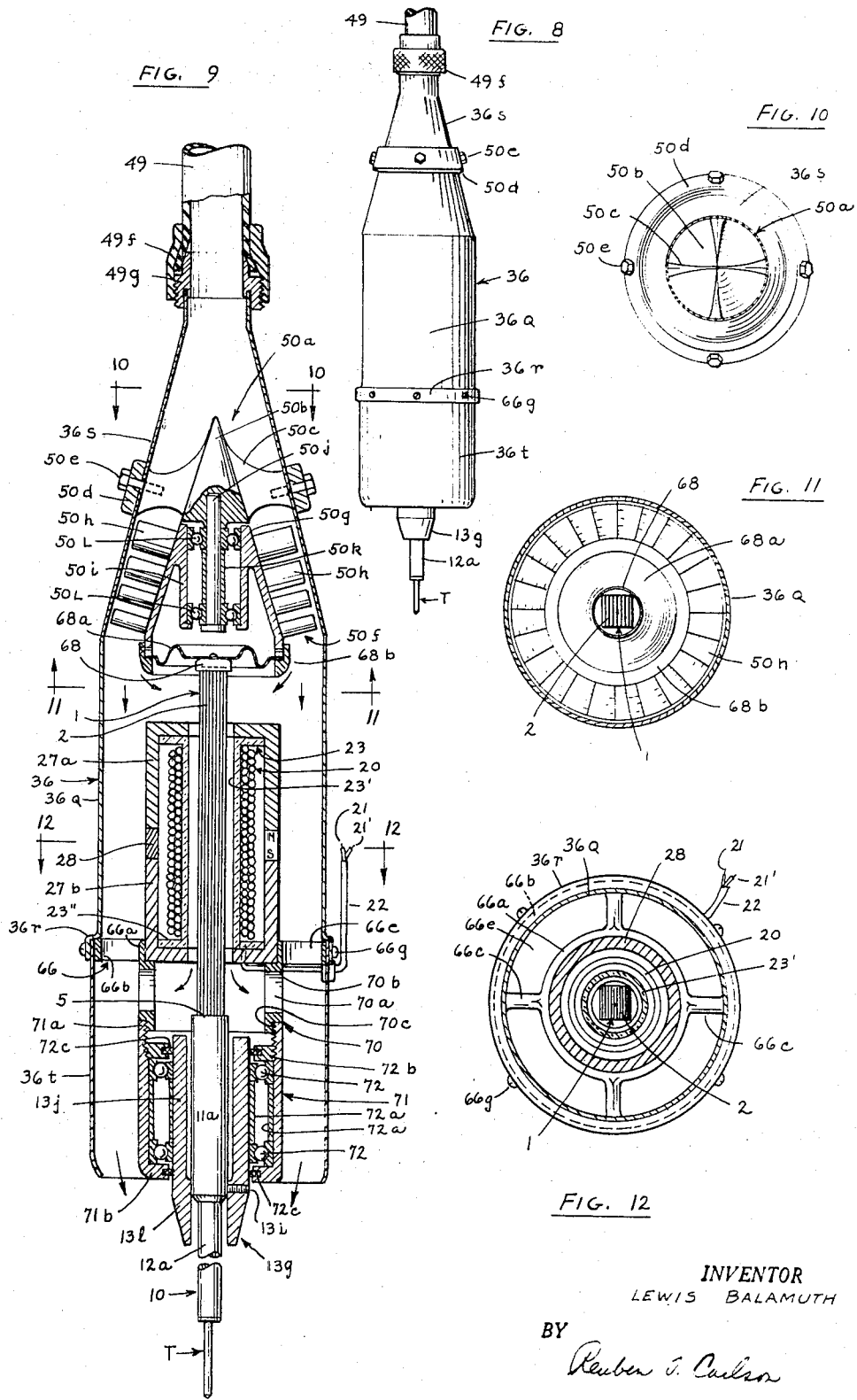

INVENTOR
LEWIS BALAMUTH
BY
Reuben J. Carlson
ATTORNEY

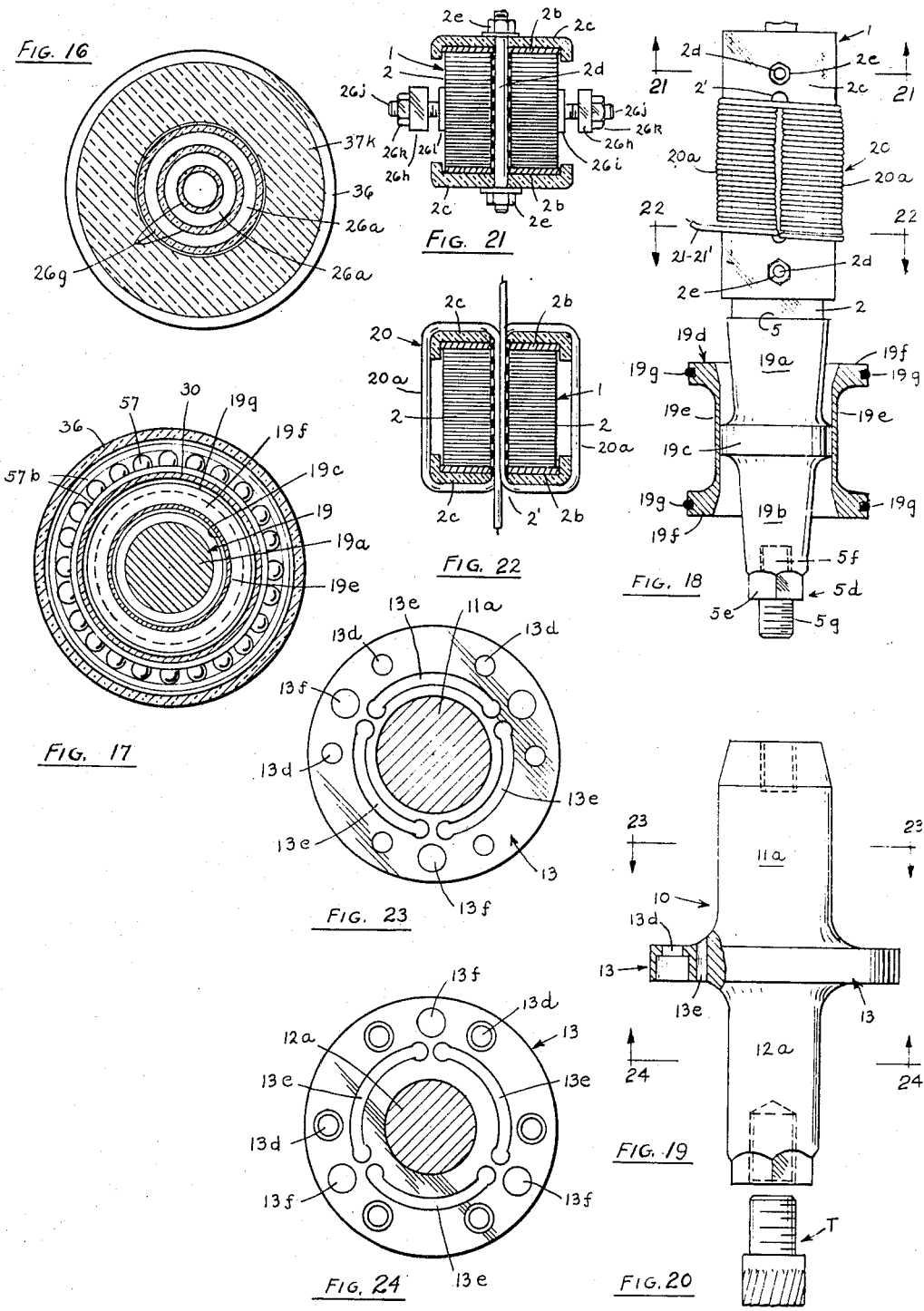

United States Patent Office 3,471,724
Patented Oct. 7, 1969

3,471,724
MAGNETOSTRICTIVE VIBRATOR FOR HIGH FREQUENCY MACHINING OF HARD MATERIALS
Lewis Balamuth, New York, N.Y., assignor to Cavitron Corporation, a corporation of New York
Filed Apr. 8, 1965, Ser. No. 446,648
Int. Cl. H02k 33/00
U.S. Cl. 310—26   1 Claim

ABSTRACT OF THE DISCLOSURE

The method and apparatus for drilling, piercing, cutting, lapping, milling, reaming, honing, grinding and polishing hard materials, in which:

(a) the relative rotary or lineal travel speed between the workpiece and work tool, and the speed of hogging or penetration of the working edge or surface of the tool into the workpiece, is within the range of the recommended cutting speed factor $\overline{V}_c$, which takes into account the physical and metallurgical characteristics of the workpiece and working edge or surface of the tool; and (b) designing and operating the working edge or surface of the tool and associated vibratory driving apparatus, so that the frequency and amplitude of vibration produces a vibration velocity vector $\overline{V}$ and a linear tool edge or point velocity $\overline{V}_L$, which results in a vector sum $\overline{V}_R$ at any instant of operation; and (c) wherein the range of the vector sum $\overline{V}_R$ is within the range of the recommended cutting speed factor $\overline{V}_c$.

---

This invention relates to high frequency machining of hard materials, and more particularly to an improved method and apparatus for rotating and simultaneously vibrating at high frequency various machine tools adapted for drilling, piercing, cutting, lapping, milling, reaming, honing, grinding, polishing and sawing hard materials with or without the use of abrasive slurry, polishing paste and workpiece lubricants and coolants, at machining speeds and precision accuracy unobtainable by customary means and methods.

The problem

The forming and shaping of extremely hard metals, metal alloys and high thermal resistance materials, such as titanium, germanium, quartz, glass, ferrites and other very hard or brittle materials, cannot be effectively and properly machined by customary procedures, since normal and customary machining practices result in residual surface stresses and surface checking of the workpiece, or the generation of very high temperatures which result in scorching of the workpiece surface being machined, or because of the difficulty or impossibility of obtaining dimensional and precision accuracy within required tolerance limits. In addition, present practices often result in rapid deterioration and destruction of the machine tool itself, and slow and tedious machining performance, requiring high machining skills which nevertheless results in a high percentage of workpiece rejects which fail to meet acceptance standards.

Summary description of the invention

The serious deficiencies of presently used machining practices are largely overcome by the practice of this invention, and whereby numerous and various extremely hard and high thermal resistant materials may be machined at high production speeds and precision accuracy with minimum generation of friction heat, with minimal tensional stresses, surface checking, scorching or disintegration of the workpiece, and the resultant production of machined parts which meet the requiremens of conventional and military aircraft, space probes and vehicles, automotive equipment and electrical appliances, as well as production tools and dies of all types.

In its general aspects, this invention embraces apparatus designed to rotate various types of work tools at desired speeds and simultaneously subject the rotating work tool to longitudinal vibrations, radial vibrations or a combination of longitudinal and radial vibrations, or orbital, circular or elliptical vibrations, at frequencies in the high sonic or ultrasonic ranges best suited to perform the desired machining operation for which the apparatus is particularly designed.

Thus, various tools such as drilling, piercing, puncturing, dicing, milling, lapping, reaming and honing tools shaped to perform the desired machining operation, may be associated with and driven by the apparatus of this invention to rotate and simultaneously vibrate the selected work tool in a direction substantially parallel to the longitudinal axis of the tool at a loop of longitudinal motion, and while the work tool continues to rotate. The longitudinal vibrations also result in a radial expansion and contraction of the work tool with beneficial results. High speed machining action is attained by combined rotation and high frequency longitudinal vibration and resultant radial expansion and contraction of the work tool, with or without the use of abrasive slurry, polishing paste or tool lubricant and coolant applied to the work area. Where the cutting portion of the work tool is assembled in association with this apparatus to both rotate and vibrate at a loop or longitudinal motion at a frequency and stroking amplitude designed into the apparatus for the most effective work performance, high speed precision machining and higher production output of finished workpieces can be attained, substantially without the generation of high friction heating, scorching or discoloration of the workpiece surface, or the development of tensional stresses and checking of the workpiece surface.

Internal cylindrical surfaces may be lapped, reamed, honed or polished in accordance with this invention by providing a bent or skewed tipped tool whose base end is connected to the apparatus to receive longitudinal vibrations, and whose tip portion or skewed portion extends at an angle from the longitudinal axis of the base portion and thus caused to flexurally vibrate with resultant orbital, circular or elliptical vibrations at the working end of the tool. The bent or skewed tool is rotated by this apparatus in working engagement with the internal cylindrical surface of the workpiece, and the working end simultaneously executes orbital motion, with one axis of orbital motion extending substantially parallel to the internal cylindrical surface and its other axis moving to and from the cylindrical surface. Thus, a work tool shaped and designed to produce the desired flexural vibrations as induced by the longitudinal vibrations delivered to the base section of the tool by the apparatus, in combination with rotation of the tool around the internal cylindrical suface of the workpiece, results in precision lapping, reaming, honing or polishing of the internal cylindrical surface of the workpiece at high production speeds, and without the generation of objectional frictional heat.

When circular cutting knives, circular saws, circular lapping tools and circular grinding and polishing wheels are axially assembled to the apparatus of this invention at a loop of longitudinal vibration, the longitudinal vibration delivered to the circular tool axially thereof produces flexural vibrations in the circular tool which causes its peripheral working portion or surface to vibrate in a direction parallel to its longitudinal axis, and which peripheral vibrations and combined rotation of the peripheral working surface of the circular tool will perform the desired machining operation on hard workpieces at high production speeds, and without resultant scorching or discoloration, or surface stresses or surface checking of the workpiece.

Circular cutting knives, circular saws, circular lapping tools, and circular grinding or polishing wheels may also be rotated and vibrated in a direction radially of the circular tool by mounting the circular tool on the apparatus in an area of a node of longitudinal vibration and where radial expansion and contraction of the mounting member is substantially at maximum. The radial expansion and contraction of the rotating circular tool moves its working periphery towards and away from the workpiece surfaces, with resultant high speed and precision forming and shaping of the workpiece surface without the generation of objectionable frictional heat or resultant scorching or discoloration of the workpiece surface, or the development of surface stresses or surface checking of the workpiece.

Apparatus may be variously designed in accordance with this invention to perform miniature, small, medium and large machining operations such as drilling, boring, trepanning, slicing, reaming, lapping, milling, cutting, sawing, grinding and polishing numerous forms of hard workpieces, and various means may be selectively employed for mounting the apparatus and rotating and vibrating the work tool or element in accordance with the machining operations to be performed.

The apparatus for rotating and simultaneously vibrating at high frequency a work-performing element in accordance with this invention, includes a vibrator unit presenting a magnetostrictive transducer section having a longitudinal length corresponding to one-half wavelength of sound traveling longitudinally through the material thereof at the frequency of the alternating magnetic field supplied by a surrounding energizing coil or winding, whose leads are supplied by high frequency alternating current from the external generator. A vibration transmitting connecting body or acoustical impedance transformer formed from a material of high tensile strength and vibration transmission capability is rigidly secured at one end thereof to one end of the magnetostrictive transducer and designed to vibrate and deliver rotational motion to a tool element fixed or secured to a loop of longitudinal vibration, or a loop of radial vibration thereof. The connecting body should have a longitudinal length corresponding approximately to one-half wavelength of sound or integral multiples thereof traveling longitudinally through the material of the connecting body at the frequency of vibration injected into the connecting body by the transducer when energized.

The vibrator unit may be variously supported in a suitable position to perform desired machining operations by the provision of a laterally extending flange formed as a part of the connecting body, and which is attached to and rotatably driven by a casing, collar or other rotatably driven member. The vibrator unit may also be supported and rotated by a rotatably driven arbor connected to the nodal flange of the connecting body, or by a rotatably driven chuck detachably clamped to a nodal area of the vibrator unit. Means are also provided for cooling the energizing coil and transducer during vibration thereof which facilitates handling of the unit, preserves the magnetostrictive properties of the transducer and insures long life to the vibrator unit.

Vibrator units designed in accordance with this invention, may be made in various forms, as determined by the machining operation to be performed. For example, the transducer may be composed of a stack of relatively thin magnetostrictive laminates which are flat or semiarcuate in cross-section, or the transducer may be formed as a single magnetostrictive tube or a series of concentric magnetostrictive tubes which are preferably provided with a closed end slit extending longitudinally thereof to reduce eddy current losses, or the entire length of the vibrttor unit may be formed from a magnetostrictive material of high tensile strength which is designed to provide support for the rotatably driven and vibrated tool spaced from the energizing coil which surrounds a section thereof. In another form of this invention, the vibrator unit may be composed of an elongated rod, bar or tube extending the full length thereof, and which provides a vibration transmission core to which the tool element is secured, and which presents a transducer section formed by a magnetostrictive tube, or a series of concentric magnetostrictive tubes, approximately one-half wavelength long and telescoped over and bonded to a selected section of the virbation transmitting core. The magnetostrictive material used in forming the vibration producing transducer section of the vibrator unit are available on the market and may comprise nickel, a nickel alloy, or other magnetostrictive material known under various trade names.

The connecting body section or vibration transmitting core of the vibrator unit may also be made of magnetostrictive material, but preferably is composed of a high tensile strength material of high vibration transmitting capabilities such as Monel metal, beryllium copper, tool steel, various metal alloys having the above-named characteristics, and glass or ceramic materials strengthened by fiber glass threads. The form and composition of the transducer section, connecting body section or vibration transmitting core of the vibrator unit is selectively determined in accordance with the machining operation to be performed.

In the performance of miniature or small machining operations, such as drilling, boring, piercing, grinding and polishing of wire drawing dies, jewel bearings, watch works and fine instrument components, the apparatus of this invention may be elemental in form, simple in construction, and quickly connected to a rotatably driven arbor or chuck. For example, the nodal flange of the vibrator unit may be clamped to one end of a tubular casing or sleeve whose other end is driven by a rotatably driven tubular arbor or rotatably driven chuck, in which case the supporting spool to which the energizing coil is applied may be fixed to rotate with the tubular sleeve or collar, and with the coil leads connected to a suitable slip ring assembly. In other simplified forms of this invention, the tubular casing or driving sleeve may be rotatably driven by an external motor or pulley transmission connected thereto, with the winding supporting spool supported in stationary position from a stationary support whose end portion is adjacent to and in alignment with the rotatably driven tubular casing.

When it is desired to employ a rotatably driven tubular arbor in the machining operation, the nodal flange of the vibrator unit may be clamped to an expansible chuck which is detachably connected to the driven tubular arbor by a tubular connecting section into which the transducer section of the vibrator unit may telescope. The connecting section is formed from a non-magnetic material which does not impede the passage of magnetic flux through the tubular wall thereof. This arrangement permits installation of the energizing coil and its supporting spool in adjacent surrounding relation to the tubular wall of the rotating connecting section, and supported by a surrounding stationary support or tubular housing, which also contains bearing assemblies for rotatably supporting the tubular driving arbor. The apparatus as thus constructed is adapted for light and medium heavy machining operations, and its various components are so made as to permit convenient withdrawal and replacement of the vibrator unit and associated tool element, and convenient assembly and disassembly thereof.

In other forms of this invention, the energizing coil and its supporting spool may be internally supported by a stationary casing fixed to a suitable external supporting bracket. In this form of assembly, the vibrator unit may be rotatably driven by a driving collar designed to be detachably secured to the nodal flange of the vibrator unit, and may be journaled in suitable bearings supported by an end section of the stationary tubular casing, or by a surrounding stationary hub forming a part of the external supporting bracket. An external variable speed motor, connected to the driving collar by a drive belt or gearing, may provide the means for rotating the vibrator unit and work performing tool element associated therewith.

Where medium to heavy grinding, polishing, cutting and sawing operations are to be performed, the circular grinding, polishing, cutting or sawing disc may be detachably secured by suitable means to either the end or loop area of the connecting body, or the nodal area thereof. The transducer, when formed of a series of concentrically arranged magnetostrictive tubes, may also serve as a rotatable connecting shaft extending between the tool supporting connecting body, and a similarly shaped but reversibly arranged driving connecting body. The tool supporting connecting body presents an enlarged diameter input section secured to one end of the transducer and a reduced diameter tool supporting output section designed to substantially increase the amplitude of vibration delivered to the tool element. To maintain dynamic balance, the reduced diameter section of the similarly shaped driving connecting body, is rigidly secured to the opposite end of the transducer, and its enlarged diameter section will accordingly vibrate at greatly reduced amplitude, and to which a drive pulley which receives minimum vibration amplitude is secured. In this construction, the opposite connecting bodies and the shaft forming transducer extending therebetween, may be rotatably journaled in a stationary housing fitted with internal bearing assemblies which surround the enlarged sections of both connecting bodies. The stationary tubular housing also provides means for supporting the winding spool and associated energizing coil in stationary but surrounding relation in the mid-section of the transducer.

Further adaptations of this invention may be employed for rotating and simultaneously vibrating circular grinding, polishing, cutting or sawing discs designed for attachment to a loop area or a nodal area of a tubular tool supporting connecting body. One end of the tubular connecting body is rigidly secured to a series of concentric magnetostrictive tubular laminates and which together provide a vibrator unit which is substantially tubular for the full length thereof and through which cooling air may flow. In this modification, the energizing coil and its supporting spool, poistioned in surrounding relation to the mid-section of the tubular transducer, may be supported by an exterior stationary casing. The stationary casing provides means by which the apparatus may be externally supported, and the stationary casing may contain internal bearing assemblies which provide rotative support for the tubular vibrator unit. The vibrator unit may be externally rotated through a pulley or gear wheel attached to a nodal area of the tubular connecting body which extends beyond one end of the stationary tubular casing.

Alternatively, the tubular vibrator unit may be supported on an axial shaft extending through the tubular vibrator unit and whose ends are journaled in stationary end brackets. Suitable spacing collars positioned at intervals between the axial shaft and tubular vibrator unit, support the vibrator unit rotating therewith. The vibrator unit may be rotatably journaled in bearing assemblies positioned within a stationary casing or housing.

The vibration producing transducer associated with the tubular connecting body may also be composed of a plurality of transducer sections one-half wavelength long fixed to one end of the tubular connecting body in radially spaced relation. Each transducer section is composed of a stack of magnetostrictive laminates embraced by an energizing winding applied to each transducer section, and whose leads are connected to a slip ring assembly contained within the outer stationary casing.

To cool the transducer and surrounding energizing coil during operation, a water coolant may be used which is introduced into one end of the casing which surrounds the transducer, and the warmed coolant withdrawn from the casing at the opposite end therof; suitable sealing gaskets being provided to prevent leakage.

In accordance with this invention, the transducer and its energizing coil may also be cooled by a stream of air introduced into one end of the casing which surrounds the transducer and the warmed air withdrawn from the other end thereof. The cooling air may also be introduced into the casing through a passage formed in the stationary support from which the casing is suspended, or through an air tube and associated closure cap connected to one end of the casing, or by a blower fan connected to one end of the casing. In a further modification of this invention, compressed air may be used to drive an air motor which rotates the vibrator unit, and the velocity reduced exhaust air from the air motor used to cool the energized transducer and the surrounding energizing coil.

The electric or air driving motor may be independently mounted and directly or indirectly connected to the vibrator unit by belt or gearing transmission. The driving motor may also be mounted in axial alignment with the vibrator unit and contained within a common housing. In such case, the driving motor may be positioned adjacent to the connecting body of the vibrator unit, with the rotor section of the motor connected to the nodal flange of the connecting body, or the rotor section of the motor may be connected as by a flexible diaphragm to the transducer by a flexible driving diaphragm.

The power supply to the energizing coil which surrounds the transducer, may be obtained from an external power generator which produces a direct current biased alternating current of the proper high frequency, and so that the energizing coil itself produces the desired high frequency alternating magnetic field in surrounding relation to the transducer. However, a greatly simplified power generator may be used which supplies only high frequency alternating current to the energizing coil, when inductor ferrite sleeves or cups are positioned in surrounding relation to the energizing coil, and with or without a permanent magnet sandwiched between the adjacent edges of the ferrite cups. In this arrangement, the magnetic field established by the ferrite cups and permanent magnet, together with the high frequency alternating field supplied to the energizing coil, produce the desired high frequency alternating magnetic field in surrounding and energizing relation to the transducer.

Where medium or heavy duty machining operations are to be performed, the apparatus of this invention is sturdily constructed for heavy duty work, can be conveniently manipulated by mounting the apparatus on a turret structure desired for axial, radial and swinging movement best designed to orient the tool element into machining engagement against the workpiece. In general, the apparatus of this invention may be constructed and designed for association with a drill press, a simple supporting structure or heavy duty machine designed to manipulate the tool element associated with the vibrator unit into precise machining engagement with the workpiece.

Other objects and advantages of this invention will become apparent as the disclosure proceeds.

Although the characteristic features of this invention will be particularly pointed out in the claim, the invention itself, and the manner in which it may be made and used, may be better understood by referring to the following description taken in connection with the accompanying drawings forming a part hereof in which:

Summary description of the drawings

FIG. 1 is a longitudinal section of a form of rotated and vibrated tool assembly which incorporates a form of vibrator unit having a series of transducer stacks and a tubular connecting body on which a slicing knife or saw is mounted at approximately a nodal area thereof, the vibrator unit being supported by an axial shaft extending through the vibrator unit and rotatably supported by stationary mounting arms and with the vibrator unit partially contained within a stationary casing, the vibrational energy being supplied to the transducer stack by a series of transducer windings through rotatiing slip rings supported by the axial shaft and contact brushes supported by the stationary casing;

FIGS. 2, 3, and 4 are transverse sections showing further structural details of the rotated and vibrated tool assembly shown in FIG. 1 and as the same would appear when viewed along lines 2—2, 3—3 and 4—4 respectively, of FIG. 1;

FIG. 5 is a fragmentary detail showing a peripheral section of the circular cutting knife or saw shown mounted at approximately the nodal area of the tubular connecting body of the vibrator unit of FIG. 1;

FIG. 6 is a fragmentary detail of a peripheral portion of the circular cutting knife or saw having peripheral cutting teeth which may be mounted on the connecting body of the tool assembly shown in FIG.1; and FIG. 7 is a fragmentary longitudinal section of the tubular connecting body of the rotated and vibrated tool assembly shown in FIG. 1, this view showing a grinding wheel mounted at approximately the nodal area of the tubular connecting body thereof.

FIG. 8 is an elevational view of a tool assembly made in accordance with this invention and wherein the rotattable vibrator unit, vibrator unit mounting, transducer energizing assembly and vibrator unit rotating motor are axially arranged and contained in the same housing;

FIG. 9 is a longitudinal section of the tool assembly shown in FIG. 8 which reveals structural details of the housing and components contained therein; and FIGS. 10, 11 and 12 are transverse sections taken along lines 10—10, 11—11 and 12—12 respectively of FIG. 9, and which disclose further structural details of the various components contained in the housing.

Figures 13, 14, 15:
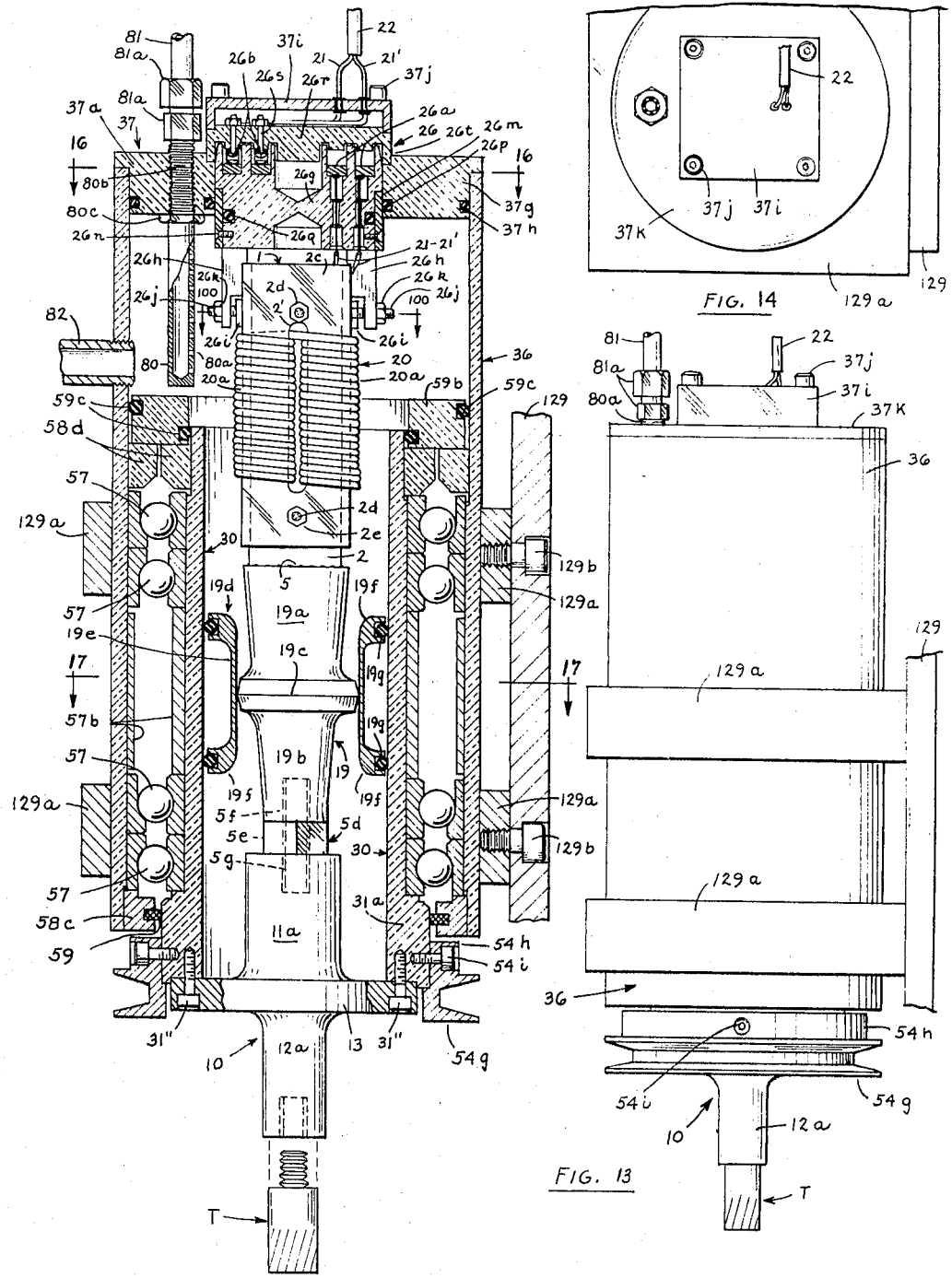
FIG. 13 is an elevational view of a tool assembly constructed in accordance with this invention and particularly designed for heavy duty machining.
FIG. 14 is an end view of the tool assembly shown in FIG. 13.
FIG. 15 is a longitudinal section of the tool assembly shown in FIG. 13 and which illustrates various structural details of its components.

FIGS. 16 and 17 are transverse sections of the tool assembly shown in FIG. 15 as viewed along lines 16—16 and 17—17 of this figure;

FIG. 18 is an elevational view of the vibrator unit associated with the tool assembly shown in FIG. 15, and which illustrates further details of the flexible spacer associated with its connecting body which provides auxiliary means for maintaining components of the vibrator unit in axial alignment during rotation;

FIG. 19 is an elevational view of a tool supporting connecting body which may be connected to the connecting body of the vibrator unit shown in FIG. 18 to provide secondary magnification of the stroking amplitude of the tool attached thereto;

FIG. 20 is an elevational view of a typical form of milling cutter designed to be detachably secured to the vibration output end of the connecting body shown in FIG. 19;

FIGS. 21 and 22 are transverse sections of the vibrator unit as the same would appear when viewed along lines 21—21 and 22—22 respectively of FIG. 18, these views illustrating further structural details of the transducer stack and its winding assembly; and FIGS. 23 and 24 are transverse sections of the connecting body shown in FIG. 19 as viewed along lines 23—23 and 24—24 thereof, these views illustrating further details of the nodal flange associated with this connecting body.

Similar reference characters refer to similar parts throughout the drawings and the specification.

The apparatus of this invention is designed to rotate and vibrate at high frequency various and numerous forms of machine tools. Machine tools such as rotary drills, piercing dies, cutting and lapping tools, milling cutters, reaming and trepanning tools of all sizes and shapes are generally referred to in the drawings and specifications by the letter T, and which tools are normally detachably or permanently secured to the loop or vibration output end of the connecting body and substantially in axial alignment with the vibrator unit. Other forms of machine tools such as wide rimmed grinding and polishing wheels are designated by the letter S in the drawings and specification; cutting and sawing discs are designated by the letter U in the drawings and specification; and narrow rimmed abrasive discs for grinding, polishing, cutting and lapping are designated by the letter V in the drawings and specification. The wheels and discs designated by the letters S, U and T are designed to be detachably or permanently secured to the vibration transmitting connecting body at a node of longitudinal vibration or a loop of longitudinal vibration thereof.

FIGS. 1–7

The tool assembly illustrated in FIGS. 1–7 is designed to rotate and simultaneously vibrate circular cutting discs, circular cutting saws, circular milling tools, grinding wheels and other forms of circular machine tools, discs and wheels, which may be selectively applied thereto for vibration in either the radial mode or the longitudinal mode. This tool assembly is particularly adapted for heavy duty machining operations, and may be made in any size and power which the machining work requires.

The vibrator unit 1 of this tool assembly comprises a tubular connecting body 10 to which a vibration producing magnetostrictive transducer assembly is rigidly secured to one end of the relatively thick tubular wall of the connecting body 10. In this modification, the magnetostrictive transducer assembly of the vibrator unit is composed of a plurality of groups of transducer stacks, each formed from a plurality of arcuately shaped magnetostrictive laminates 2a which are compactly stacked in radial arrangement as shown in FIG. 3, with each laminate 2a rigidly secured to an end face of the tubular wall of the connecting body as by a silver solder joint 5. The arcuate laminates have a curvature which substantially conforms to the curvature of the tubular wall of the connecting body to which it is rigidly attached, and so formed that each transducer stack group is substantially confined within the inner and outer circumference of the tubular wall of the connecting body. Each arcuate laminate 2a may be of any desired width, but preferably has a width which limits its arcuate curvature to less than forty-five degrees, and preferably in the order of fifteen to thirty degrees, which thereby assures compact stacking of the arcuate laminates which compose the respective transducer stack groups. By making the laminates of arcuate cross-section they may be made sufficiently thin to insure the penetration of alternating magnetic flux through substantially the entire thickness of each laminate, without sacrifice of necessary stiffness to resist buckling strains during vibration. Each transducer stack group has a longitudinal length which corresponds to a one-half wavelength of sound traveling longitudinally through each transducer stack group at the selected frequency of operation.

The energizing winding 20 for the radially arranged and plural groups of magnetostrictive transducer stacks is applied to the nodal area of each of the respective transducer stacks in series arrangement 20a as shown in FIG. 3. To protect the insulating coating of the winding wire from being cut or damaged by the sharp edges of the arcuate laminates of each stack group, each stack group is encased in a stack wrap 20b which may be formed from a strong fibrous material and over which the series winding 20a is tightly wound and supported. The series wound energizing winding 20a, as tightly wound on each transducer stack, clamps the stack wrap 20b tightly around the nodal area of the transducer stack, and thus serves to maintain the arcuate laminates of each transducer stack in compactly assembled relation during vibration. The upper end of each transducer stack group 2a is enclosed within an end cap 5c which may be soldered to the respective laminates of each stack group, as shown in FIG. 1.

The tubular connecting body 10 has a length which approximately corresponds to one-half wavelength of sound traveling longitudinally therethrough at the frequency of vibration of the series wound transducer stacks, and thus presents a vibration input section 11b to whose end each of the laminates of each of the transducer stack groups is rigidly secured as by the silver solder joint 5. The tubular vibration output section 12b of the connecting body 10 may have a driving pulley 54 secured thereto adjacent the terminal end thereof and over which a drive belt 54′ is trained. To rigidly lock the driven pulley 54 to the terminal end portion of the tubular connecting body 10, the terminal end portion of the connecting body may present a polygonally shaped exterior portion 12d which snugly receives the correspondingly shaped inner rim of the pulley 54 as telescoped thereover, with one side face of the pulley positioned in abutment against an inset shoulder formed at the terminal end portion of the vibration output section 12a of the tubular connecting body 10, as shown in FIG. 1. The connecting body 10 also presents a threaded tubular extension 12e to which a polygonal lock nut 12c is applied to thereby clamp the driven pulley 54 in fixed position to the terminal end portion of the connecting body 10.

The tubular connecting body 10 also has a clamping hub 13′ positioned at the nodal area thereof which may be secured to the tubular wall of the connecting body as by one or more set screws as shown in FIG. 1. The nodal clamping hub 13′ is designed to receive and support a circular member which may be a circular cutting tool or saw U as shown in FIGS. 1, 5 and 6, or a circular grinding or polishing wheel V as shown in FIG. 7. The circular work member is provided with a polygonal shaped hole which defines a polygonal shaped inner rim which is snugly telescoped over a correspondingly shaped polygonal body portion of the nodal clamping hub 13′, and then pushed into abutment against a flange portion presented by the nodal clamping hub 13′ by a threaded polygonal shaped clamping collar or nut 13″ threaded onto a threaded tubular extension of the hub 13′ as shown in FIG. 1. As thus mounted, the circularworking periphery of the circular work element, such as the circular cutting knife or circular saw U or the circular grinding or polishing wheel V is radially vibrated when the vibrator unit 1 is energized and which results in the high frequency radial expansion and contraction of the working periphery of the circular tool, as generated by the radial expansion and contraction of the nodal area of the tubular connecting body 10 in accordance with Poisson's ratio.

It will be appreciated that the driven pulley 54 may be interchanged in position with respect to the circular work element U or V, by mounting the driven pulley 54 on the nodal clamping hub 13′, and then mounting the circular work element on the hexagonal shaped body portion 12d at the terminal end portion of the tubular connecting body 10. To permit convenient interchange, the polygonal shaped hole in the driven pulley 54 and circular work element U or V, may be made of the same size, a filler collar having a hexagonal hole whose hexagonal inner rim is formed to fit the polygonally shaped terminal portion 12d of the connecting body 10, and whose outer rim is hexagonally shaped and sized to conform to the hexagonal body portion 13a of the nodal clamp hub 13′, and which hexagonal shaped collar with extended abutment flange may be applied to the polygonal shaped terminal portion 12d of the connecting body to thereby receive and rotatably support either the driven pulley 54 or the circular work element U or V.

The vibrator unit comprising the magnetostrictive transducer stack groups 2a and tubular connecting body 10 to which the driving pulley and circular work tool is attached, are rotatably supported by an axial idler shaft 115 which extends through the entire vibrator unit and whose ends project from the ends of the vibrator unit as shown in FIG. 1. The supporting and aligning shaft 115 is supported by a pair of stationary bracket arms 116 at each end thereof. The upper bracket arm 116, as shown in FIG. 1, is provided with a circular hip portion 116′ which fits within one end of a stationary tubular protective casing 36 and is secured thereto by one or more set screws 116″. The hip portion 116′ of the upper bracket arm 116, as well as the lower bracket arm 116, each presents a bore in which the adjacent terminal end of the supporting and aligning shaft 115 is rotatably supported as by a bearing assembly 117 set within the bore and held in position by a suitable bearing retainer ring 118, and having associated bearing seals 119 to maintain the bearing lubricant within the bearing cavity. The other end of the stationary tubular casing 36 may be suported by a bearing assembly 57 positioned between the rotated upper end portion of the tubular connecting body 10 and the adjacent terminal end portion of the stationary tubular casing 36. A bearing retainer collar 58 may be threadably connected to the adjacent end of the stationary tubular casing 36, with suitable bearing seals 59 provided to maintain the bearing lubricant within the bearing cavity which contains the bearing assembly 57.

The terminal leads 21–21′ extending from the series windings 20a as applied to and rotating with the transducer stack groups, may be threaded through suitable axial holes in a non-conductive tubular sleeve element 21a to prevent whipping of the winding leads 21–21′ as they rotate with the series transducer windings 20a and axial shaft 115. The tubular sleeve element 21a forms a part of a rotating insulating block or plate 26e which is fixed to the axial shaft 115. The rotating insulating plate 26e supports the rotating contact rings 26a of a slip ring assembly 26, with the winding leads 21–21′ electrically connected to the respective rotating contact rings 26a. An adjacent stationary brush supporting plate 26f, fixed to and supported by the stationary tubular casing 36, supports the stationary spring pressed contact brushes 26b whose brushes are in current transferring riding contact with the rotating contact rings 26a of the slip ring assembly 26. The stationary winding leads 21–21′ connected to the spring pressed contact brushes 26b are encased within a protective sheath 22 which extends through the tubular wall of the stationary tubular casing 36, with the stationary winding leads 21–21′ connected to an external generator which generates the biased alternating current of selected high frequency to energize the series windings 20a applied to the nodal area of the respective transducer stack groups.

The transducer stack groups 2a and tubular connecting body 10 which comprise the vibrator unit 1, are rotatably supported by the axial aligning shaft 115 by a series of spaced supporting discs 115a, each having a collar portion which is fixed to the shaft 115, and a resilient tire 115b applied to the periphery thereof. FIG. 1 shows two support discs 115a in compressing supporting contact with the inner cylindrical bore of the tubular connecting body 10. The resilient tire 115b associated with the supporting disc 115a at the upper end of the vibrator unit as shown in FIG. 1, is in compressive bearing contact with the inner rim of each of the soldered end caps 5c, to thereby maintain and support the respective magnetostrictive transducer stack groups 2a in axial alignment with the shaft 115.

Cooling air for cooling the energized transducer stack groups and tubular connecting body 10, is admitted into the stationary tubular casing 36 adjacent the upper end thereof as by a cooling air inlet tube 49. The cooling air as thus admitted divides into two streams; one air stream flows in surrounding heat transfer relation to the transducer stack groups 2a and the series windings 20a applied thereto, and then out through suitable holes or ports 35 provided in the opposite end of the stationary tubular casing 36. Another air stream flows through axial holes 115c formed in the spaced supporting discs 115a to thereby further cool the transducer stack groups 2a and the series windings 20a, and which then flows through the bore of the tubular connecting body 10 to cool the same, and thence discharged through the open terminal end thereof.

The circular shaped machining tools for which the tool assembly shown in FIGS. 1–7 is particularly designed to rotate and vibrate, may be interchangeably applied to the nodal area of the tubular connecting body 10, or the terminal end portion of the tubular connecting body 10, of its vibrator unit 1. When the circular tool element is applied to the nodal area of the connecting body 10 as above explained, radial vibrations are transmitted through the circular tool element to cause radial expansion and contraction of its working perimeter. Where the circular tool element is applied to the terminal end portion of the half wavelength tubular connecting body 10, the circular tool element is vibrated in the longitudinal mode to cause its working periphery to vibrate in an axial direction, and which longitudinal vibrations may be further compounded and increased by flexural vibrations engendered in the circular tool in accordance with its flexural characteristics, which may be designed into the circular tool.

These various radial, longitudinal and flexural modes of vibration designed into the vibrator unit and the tool assembly as a whole, may be used individually or in combination, and in further combination with the selective speed of rotation of the circular tool, to perform numerous cutting, sawing, slicing, milling, grinding and polishing operations on hard and brittle workpiece components with remarkable efficiency, accuracy and production speeds, when these various vibrational modes are separately or collectively used and circumscribed as hereafter explained.

FIGS. 8–12

FIGS. 8–12 illustrate an exemplification of a high frequency vibrated and rotated tool assembly whose vibrator unit is rotated by a compressed air motor and whose air output is used to cool the vibrator unit. The vibrator unit 1 comprises a magnetostrictive section which may be composed of a stack of relatively flat and thin magnetostrictive laminates 2 compactly stacked together and having a length corresponding to one-half wavelength of sound traveling longitudinally through the material of the transducer stack at the selected operating frequency. Each laminate 2 of the transducer stack is secured as by a soldered joint 5 to a tool supporting connecting body 10. The combined length of the connecting body 10 and tool T attached thereto is made to substantially correspond to a half wavelength of sound or integral multiples thereof transmitted longitudinally through the material thereof at the selected operating frequency, and whereby the working end of the tool T is positioned substantially at a loop of longitudinal vibration. The vibration input section 11a of the connecting body 10 is of larger mass than its vibration output section 12a to thereby magnify the amplitude of vibrations at the operating end of the tool T as compared to the amplitude of vibrations injected into the input end of the connecting body 10 by the transducer stack 2.

Energizing flux is supplied to the transducer stack 2 around the nodal area thereof by an energizing winding 20 supported by a stationary winding spool 23 having a tubular body 23' whose bore is of sufficient diameter to permit the transducer stack 2 to freely rotate therein. The spool 23 may be provided with winding confining flanges 23", and the winding supporting spool is made of a material which does not impede the travel of high frequency alternating flux generated by the coil winding through the spool walls and into surrounding energizing relation to the transducer stack 2. The embodiment shown in FIGS. 8–12 also incorporates a pair of matching inductor ferrite sleeves or cups 27a and 27b which enclose and support the energizing winding coil 20 and the winding spool 23 as shown in FIG. 9. A permanent magnet ring 28 is positioned between the north and south pole rims of the matching inductor ferrite cups 27a and 27b. High frequency alternating current is supplied to the winding 20 by winding leads 21–21' which may be encased within a protective sheath 22, and which winding leads are connected to a high frequency alternating current generator tuned to excite the winding 20 at the selected operating frequency for which the transducer stack 2 and vibrator unit 1 as a whole is designed. The winding 20 generates a high frequency alternating field which is magnetized by the magnet 28 and intensified by the inductor ferrite cups 27a and 27b, to thereby produce an intensified field of biased high frequency alternating magnetic flux in concentrated surrounding relation to the transducer stack 2.

The winding 20, winding supporting spool 23, ferrite cups 27a–27b and permanent magnet ring 28, are assembled as a unit, and contained within the tubular body section 36q of a stationary tubular casing 36. The stationary tubular casing 36 has a conically shaped upper end extension 36s which contains the driving unit, which in the form shown in FIG. 9, is a compressed air motor 50a. The vibrator unit 1 is supported within the cylindrical body section 36q of the stationary casing 36 by means of a supporting spider 66 which presents an inner rim 66a and an outer rim 66b joined by radial spokes 66c which define air passages 66e therebetween. The outer rim 66b is supported by and secured to the flared end portion 36r of the cylindrical body section 36q of the stationary casing 36, as by suitable securing means such as screws 66g shown in FIGS. 9 and 12. The stationary casing 36 is also provided with a tubular lower extension 36t which encloses the vibration input section 11a of the connecting body 10 and which is secured as by the screws 66g to the lower end 36r of the cylindrical body section 36q of the stationary casing 36 and the outer rim 66b of the supporting spider 66.

The vibrator unit 1 is supported by a nodal tube 13g which telescopes over the vibration input section 11a of the connecting body 10, and which presents a tapered nodal body 13l which is secured as by a set screw 13i to the connecting body 10 at a nodal area of longitudinal vibration thereof. The nodal tube 13g, which rotates with the vibrator unit 1, is rotatably supported by a bearing hanger 71 having a lower internal flange portion 71b. A bearing cavity is defined between the inner surface of the bearing hanger 71 and outer surface of the tubular extension 13j of the nodal tube 13g, and in which a pair of spaced thrust bearing assemblies 72 are contained which are separated by suitable spacer sleeves 72a. The spaced bearing assemblies 72 and bearing spacer sleeves 72a are positioned between the lower inturned flange portion 71b of the bearing hanger 71 and a bearing retainer ring 72b which may be threaded to the upper end portion 71a of the bearing hanger 71. Suitable bearings seals 72c are positioned between the tubular extension 13j of the nodal tube 13g and the retainer ring 72b and the internal flange portion 71b of the bearing hanger 71, to retain the bearing lubricant within the bearing cavity. The bearing hanger 71 is suspended from a tubular coupling 70 having radial air discharge ports 70a extending through the tubular body thereof, and which terminates in a lower attachment rim 70c to which the threaded upper end portion 71a of the bearing hanger 71 may be threadably connected. The tubular coupling 70 may be welded to or otherwise formed integral with the inner rim 66a of the supporting spider 66, and presents an inwardly extending rim 70b directly below the inner rim 66a of the supporting spider 66 which provides a supporting seat for the inturned flange portion of the ferrite cup 27b and which thus supports the entire winding and energizing assembly.

The compressed air motor 50a, which forms the driving unit 50 for the tool assembly shown in FIGS. 8–12, presents a conical supporting core 50b having radial extending supporting wings 50c which are contained and supported within the conical upper section 36a of the stationary casing 36, as by means of an external clamp ring 50d which is secured to the outer ends of the respective radial supporting wings 50c as by securing bolts 50e, as shown in FIGS. 9 and 10. The compressed air motor 50a also includes a rotor part 50f positioned directly below the conical supporting core 50b and which presents a conical rotor wall 50g having a series of sets of rotor blades 50h extending laterally therefrom. Four sets of rotor blades 50h are shown in FIG. 9, and each blade set has an inclined camber of varying inclination, as is customary in air rotors, so that the compressed air motor delivers maximum driving power. The air rotor part 50f is provided with a cylindrical body section 50i which may be formed integral with the conical rotor wall 50g. One end of an axially extending rotor supporting rod 50j is fixedly secured to the enlarged end of the conical supporting core 50b, and a pair of spaced thrust bearing assemblies 50L and associated bearing spacer sleeve 50k are pocketed within the cavity defined between the cylindrical body section 50i of the rotor and the rotor supporting rod 50j. The rotor part 50f is thus rotatably suspended on the stationary supporting rod 50j and which is in turn suspended from the conical supporting core 50b of the air motor.

A driving connection is provided between the compressed air motor 50a and the vibrator unit 1, which may comprise an end cap 68 which is telescoped over and may be secured as by silver solder to the adjacent end of the magnetostrictive laminates 2 which comprise the transducer stack as shown in FIGS. 9 and 11. A flexible diaphragm 68a, formed of a highly flexible and relatively thin metal or other material adapted to withstand high frequency vibrations, is suitably secured to the end cap 68. The flexible diaphragm 68a may present concentric undulations to increase its flexibility and strength, and the outer rim of the flexible diaphragm 68a is secured as by a suitable clamp ring 68b to the lower end extension of the conical wall 50g of the air rotor part 50f. It is thus seen that when the air rotor part 50f is rotated by a stream of compressed air of regulated velocity, its rotation is transmitted through the flexible diaphragm 68a to the upper end of the transducer stack 2, and which in turn rotates the connecting body 10 and tool attached thereto.

Since compressed air is a power utility with which most machine shops are equipped, compressed air of regulatable pressure may be stopped from an available compressed air supply line by an air tube 49. The air tube 49 is connected to the reduced diameter end of the conical section 36s of the stationary casing 36 which houses the compressed air motor 50a, as by an adapter collar 49g which may be rigidly secured or soldered to the reduced end of the conical section 36s, and over which the terminal of the compressed air tube 49 is telescoped and then clamped thereto as by a threaded locking sleeve 49f.

The compressed air, substantially shorn of its driving velocity as it passes through and is discharged from the final set of rotor blades 50h, enters the cylindrical body section 36q of the stationary casing 36 and divides into two air streams as it passes therethrough. One of these air streams passes through the tubular body 23' of the winding supporting spool 23 to thereby cool the transducer stack 2 as well as the winding 20 and its supporting spool 23. This air stream as thus warmed discharges through the radial air ports 70a of the tubular coupling 70 and thence enters the cylindrical tube extension 36t of the stationary casing 36 for discharge through the open lower end thereof. The second air stream flow between the tubular body section 36q of the casing 36 and the exterior of the ferrite cups 27a–27b to thereby cool the cups and further cool the energizing winding 20 contained therein. This stream of warmed air discharges through the air passages 66e defined between the radial spokes 66c of the supporting spider 66, and thence passes through the cylindrical tube extension 36t of the stationary casing 36 for discharge through the open end thereof.

The tool assembly shown in FIGS. 8–12 may be compactly made to occupy relatively little space, since it combines the rotative driver unit 50, the vibrator unit 1 and its energizing assembly in a single housing. Thus, this tool assembly can be conveniently manipulated, and may be made to rotate and simultaneously vibrate, miniature, small and medium size tools of various forms which may be detachably secured to the vibration output end of its connecting body 10.

FIGS. 13–24

The tool assembly illustrated in FIGS. 13–24 is particularly designed for heavy duty machining and may be designed to rotate and vibrate various machine tools requiring as much as 5,000 watts of biased high frequency alternating current power. This tool assembly is accordingly very sturdily built and designed to be advanced, retracted and oriented with respect to the workpiece by mounting the same on a machine structure.

The vibrator unit 1 of this tool assembly comprises a magnetostrictive transducer stack which may be composed of a plurality of relatively thin and flat magnetostrictive laminates 2 compactly stacked together, and having a relatively narrow longitudinal slot 2' in each of the laminates arranged in aligned relation to receive series windings 20a applied to the legs of the stack to provide the energizing winding 20 for the transducer. The stack laminates have a length corresponding to one-half wavelength of sound traveling longitudinally through the transducer stack at the selected operating frequency.

To protect the insulating coating of the series windings 20a from being cut by the relatively sharp corners of the transducer stack, non-conducting protective plates 2b which may be formed from fibrous material are applied to opposite sides of the transducer stack and which may be further encased within non-conductive clamping members 2c of generally U-shaped form, as shown in FIGS. 18, 21 and 22, and around which the series windings 20a are tightly applied. The series windings 20a thus serve to maintain the flat laminates 2 in compactly stacked relation. The transducer stack laminates may be further clamped together by a pair of clamp rods 2d each extending through an enlarged hole formed adjacent each end of the transducer stack, and having clamping nuts 2e applied to the projecting threaded ends thereof which may be tightened to further maintain the stack laminates in compactly stacked relation.

The work tool T may be detachably secured to the vibration output end of a connecting body 10 which presents a nodal flange 13 at the nodal area of longitudinal vibration thereof. The combined length of the connecting body 10 and tool T corresponds to a half wavelength of sound traveling longitudinally through these components, so that the working end of the tool T is located at a loop of longitudinal vibration. To increase the amplitude of longitudinal vibration of the work tool T, the connecting body 10 may be formed as an amplitude increasing acoustical impedance transformer by making the vibration input section 11a thereof on one side of its nodal flange 13 of larger mass than its vibration output section 12a on the other side of its nodal flange 13. To further increase the stroking amplitude of the tool T as attached to the connecting body 10, an intermediate amplitude increasing acoustical impedance transformer 19 may be provided which has a longitudinal length corresponding to one-half wavelength of sound traveling longitudinally through the material of the intermediate transformer 19 at the operating frequency. One end of each of the compactly stacked laminates 2 is secured as by a silver solder joint 5 to the vibration input end of the intermediate transformer 19. The intermediate transformer 19 may present an enlarged body portion 19c at the nodal area of longitudinal vibration thereof, and primary magnification of its vibrational amplitude may be effected by making its vibration input section 19a, to which the stack laminates are joined, of greater mass than its vibration output section 19b on the other side of its enlarged nodal body portion 19c.

The vibration output end of the intermediate transformer 19 may be permanently connected to the vibration input end of the connecting body 10 or secondary transformer which provides secondary magnification of the longitudinal stroking amplitude of the tool T as applied to the vibration output end thereof. For convenience in assembly, the tool supporting transformer or connecting body 10, may be detachably secured to the vibration output end of the intermediate transformer 19, as by a coupling connection 5d having a polygonal body 5e to which a wrench may be applied, a threaded stud extension 5f designed to be threaded into a threaded bore provided in the vibration output end of the intermediate transformer 19, and a threaded stud extension 5g designed to be threaded into a threaded bore formed in the vibration input end of the tool supporting transformer 10. The connecting bodies or transformers 19 and 10 are formed of a metal of high tensile strength and vibration transmitting capabilities, and are so shaped, formed and constructed as to magnify the longitudinal stroking amplitude of the tool T applied thereto to thereby effectuate a tool stroking amplitude which is magnified to a degree which best performs the desired work.

The vibrator unit 1 is supported by a rotatable tubular casing 30 which encloses the vibration input section 11a of the tool supporting transformer 10, the intermediate transformer 19, and a substantial portion of the transducer stack 2, as shown in FIG. 15. The rotatable vibrator unit supporting casing 30 is provided with an enlarged end rim 31a at the lower end thereof to which the nodal flange 13 of the tool supporting connecting body 10 is secured as by means of spaced bolts 31″ whose heads are inset within inset bolt holes 13d formed in the nodal flange. The nodal flange 13 is also preferably provided with a series of arcuately shaped closed end slots 13e as shown in FIGS. 23 and 24 designed to absorb the radial vibrations transmitted to the nodal flange 13 as a result of the longitudinal vibration of its connecting body 10. To further absorb these radial vibrations transmitted into the nodal flange 13, the nodal flange may also be provided with a series of circular vibration absorbing holes 13f positioned exteriorly of but adjacent to the adjacent closed ends of adjacent arcuate slots 13e as shown in FIGS. 23 and 24. The nodal flange 13 is made of sufficient thickness to provide for adequate strength, and the arcuate closed end slots 13e and spaced holes 13f operate to absorb substantially all of the radial vibrations transmitted to the nodal flange 13 as a result of the longitudinal vibrations of its connecting body 10, and without material transfer of either longitudinal or radial vibrations to the tubular casing 30 which supports the vibrator unit 1.

To maintain the intermediate transformer 19 as well as the transducer stack 2 connected thereto in axial rotative alignment with the connecting body 10 and tool T attached thereto, a flexible aligning spacer 19d may be provided which presents a flexible tubular body 19e against which the enlarged nodal body portion 19c of the intermediate transformer 19 abuts. The flexible tubular body 19e may be secured by spot welds to the enlarged nodal body portion 19c of the intermediate transformer 19. The flexible aligning spacer 19d is also provided with enlarged outwardly projecting end flanges 19f which support resilient contact rings 19g positioned in resilient bearing relation to the inner surface of the rotatable vibrator unit supporting casing 30. Thus, the tubular body 19e and the associated resilient contact rings 19g of the flexible vibrator unit aligning spacer 19d absorbs the radial vibrations generated in the enlarged nodal body portion 19c when the intermediate transformer 19 is longitudinally vibrated, so that substantially no radial or longitudinal vibrations are transmitted to the rotatable vibrator unit supporting casing 30.

The rotatable vibrator unit supporting casing 30 is rotatably supported by a pair of upper thrust bearing assemblies 57 and a pair of lower thrust bearing assemblies 57 maintained in spaced relation by suitable spacing collars 57b. The upper and lower bearing assemblies 57 and associated spacing collars 57b are pocketed within a bearing cavity defined between the outer surface of the rotatable vibrator unit supporting casing 30 and the inner surface of a stationary tubular casing 36 as shown in FIG. 15. The stationary tubular casing 36 has a lower bearing retainer ring 58c which may be threadably connected to the cylindrical inner surface thereof, and a suitable bearing seal 59 may be positioned between the stationary bearing retainer ring 58c and the outer surface of the enlarged end rim 31a of the rotatable supporting casing 30 to thereby retain the bearing lubricant within the bearing cavity. A pair of upper bearing retainer rings 58d may be respectively secured to and positioned between the rotatable supporting casing 30 and the adjacent stationary casing 36, and an upper oil seal 59b may be positioned over the retainer rings 58d and further provided with resilient sealing gaskets 59c to retain the bearing lubricant in the bearing cavity.

The tool assembly shown in FIGS. 13–24 may be detachably mounted on the mounting plate 129 of any machine structure by means of a pair of clamp blocks 129a as shown in FIGS. 13–15. Each of the clamp blocks 129a may be generally rectangular in exterior form but provided with a circular hole into which the stationary tubular casing 36 of this tool assembly may be telescoped. The spaced clamp blocks 129a may be detachably secured or permanently secured to the stationary tubular casing 36 as telescoped therethrough, and the clamp blocks 129a may be detachably secured to the mounting plate 129 as by securing screws 129b, with the ends of the securing screws 129b in gripping engagement with the stationary casing 36 of the tool assembly as shown in FIG. 15. The vibrator unit 1 and its rotatable supporting casing 30 may be rotated by a ring-shaped pulley 54g which presents a tubular rim 54h which telescopes over and may be secured as by securing screws 54i to the enlarged end rim 31a of the rotatable vibrator unit supporting casing 30. A drive belt may be trained around the ring-shaped pulley 54g and driven by a drive pulley of any machine structure.

Since the vibrator unit 1 and its associated transducer stack 2 and energizing winding 20 are rotated as a unit by a drive pulley 54g, a slip ring assembly 26 must be used to provide a power connection between the winding 20 and an external generator designed to produce a biased alternating current of adjustable high frequency. The slip ring assembly 26 may be composed of a rotatable insulating core 26g having spaced suspension legs 26h. An insulating clamp plate 26i is secured to a clamp stud 26j threadably connected to the lower end of each suspension leg 26h. Each clamp stud 26j is provided with a lock nut 26k and whereby the clamp studs 26j when manipulated to move the clamp plates 26i into gripping engagement with the opposite flat sides of the transducer stack, may be locked in position and so that the insulating core 26g rotates with the transducer stack 2.

The winding leads 21–21′ extending from the series windings 20a extend through the rotating insulating core 26g and are connected to a pair of concentric current conducting contact rings 26a which are embedded in the upper face of the insulating core 26g. The rotating insulating core 26g is embraced by a self-lubricating bearing sleeve 26m which may be secured to the rotating insulating core 26g as by securing screws 26n as shown in FIG. 15. The rotating bearing sleeve 26m is journaled within a stationary end closure collar 37g which is fitted within the adjacent end of the stationary tubular casing 26. The insulating end closure collar 37g may be provided with an external sealing gasket 37h bearing against the inner surface of the stationary casing 36, and an inner sealing gasket 26p which bears against the rotating bearing sleeve 26m to thereby maintain the transducer coolant within the casing 36. A resilient sealing gasket 26q may also be positioned between the bearing sleeve 26m and the insulating core 26g to prevent leakage of transducer coolant supplied to the stationary casing 36.

Spring pressed contact brushes 26b are supported by a stationary insulated brush supporting plate 26r and are positioned to ride in current transferring contact against the rotating contact rings 26a. The stationary brush supporting plate 26r may be provided with a perimetrical rim 26t which telescopes over the upper end of the rotating insulating core 26g, and is tightly fitted to the outer end face of the end closure collar 37g. The spring pressed contact brushes 26b are provided with brush supporting studs 26s which extend through the stationary brush supporting plate 26r and are thence connected to the vibratory power input wires 21–21'. A cup-shaped end closure cap 37i has a rim flange which seats against the outer face of the stationary brush supporting plate 26r and is removably secured thereto as by bolts 37j. The power wires 21–21' extending from the brush supporting studs 26s are threaded through the cup-shaped end closure cap 37i and then encased in a protective sheath 22, with the power lines 21–21' thence connected to an external generator which generates the biased alternating current of controlled high frequency which is supplied to the winding 20. Access to the interior of the stationary casing 36 for repair and adjustment of the components contained therein may be readily effected by first removing the cup-shaped end closure cap 37i which permits removal of the stationary brush supporting plate 26r and the insulating end closure collar 37g.

A tool assembly of high vibratory power and designed to perform heavy machining, requires a high powered transducer stack 2 which generates substantial heat during vibration. To maintain the high powered transducer stack in relatively cool operating condition, a continuous flow of liquid coolant around the transducer stack provides the most satisfactory cooling. As shown in FIG. 15, a liquid coolant such as water may be injected into the head end of the stationary casing 36 as by means of a closed end liquid coolant spray tube 80 which extends into the stationary casing 36 in adjacent relation to the transducer stack 2 and which presents spray ports 80a which sprays the coolant over the transducer stack. The spray tube 80 is provided with a threaded extension 80b extending through the end closure collar 37g and secured thereto as by a clamp collar 80c. A liquid inlet tube 81 is connected to the threaded extension 80b of the spray tube 80 as by a suitable coupling connection 81a.

The liquid coolant as thus sprayed into the head end of the stationary casing 60 flows around the transducer stack 2 and series windings 20a, and around the vibration input section 19a of the intermediate transformer 19, but is prevented from passing beyond the enlarged nodal body portion 19c of the intermediate transformer 19 by reason of the flexible vibrator unit aligning spacer 19d which provides a seal between the intermediate transformer 19 and the tubular wall of the rotatable casing 30. After the coolant has circulated around the transducer stack 2 and its winding 20 and the upper part of the intermediate transformer 19, the warmed coolant is discharged through a discharge tube 82 connected to the tubular wall of the stationary casing 36 adjacent the upper end thereof. The liquid coolant is prevented from entering the bearing cavity by reason of the sealing gaskets 59c associated with the upper bearing sealing ring 59b, and is prevented from escaping from the head end of the stationary casing 36 by the sealing gaskets 37h and 26p associated with the end closure collar 37g. This cooling system and associated liquid seals permits orientation of the tool assembly shown in FIG. 15 through any desired angle as the work may require without leakage of liquid coolant.

Vibrator unit design and operating principles applicable to simultaneously rotated and vibrated machining tools In the high frequency machining of hard materials in accordance with this invention, and wherein the tool element or work tool is simultaneously rotated and vibrated at high frequency, both the structural design and method of operating the vibrator unit and its associated driving apparatus should be coordinated with a number of factors relevant to each particular machining operation, to insure optimum results.

Accommodation

To insure convenient and precise accessibility of the simultaneously rotated and vibrated machine tool to the workpiece area to be machined, account should be taken of the size, shape and form of the workpiece and the workpiece area to be worked or machined, when selecting the most advantageous shape and form of tool supporting vibrator unit and its associated supporting and driving apparatus. Additionally, the shape and form of the vibrator unit and associated apparatus should be coordinated with the machine mounting which supports and manipulates the workpiece, and the manipulative features of the machine structure which supports, orients and manipulates the vibrator apparatus, to thereby insure high speed machining of the predetermined workpiece areas of the particular workpiece.

For example, where a miniature, light or medium machining operation is to be performed, the casing 30 of the apparatus and the vibrator unit 1 detachably secured thereto may be detachably connected to a rotatable driving arbor or chuck of a drill press or driving machine. Where the transducer energizing coil 20 is supported by and rotates with the casing 30, a slip ring assembly 26 would normally be provided. The slip ring assembly may be associated with any conveniently positioned stationary part and rotatable part of the structure, and from which power leads extend to the energizing coil and an external source 29 of high frequency alternating energizing current. Tool accessibility to the workpiece area of even the most complicated workpieces, can be attained by making the rotatable casing 30 of suitable length and relatively small in diameter, and/or by making the longitudinal length of the tool supporting connecting body 10 substantially equal to a half wavelength of sound or an integral plural number of half wavelengths of sound, as particular conditions require.

Where the form and shape of the workpiece or the area to be machined requires, or where the machine structure which is to support the vibratory apparatus is not provided with a rotary drive, the apparatus of this invention may be designed to accommodate such special conditions by placing the rotary driving motor within an elongated stationary casing 36 and connecting its rotor to and in axial alignment with the vibrator unit contained in the casing as exemplified in FIGS. 9–12. If desirable, the stationary casing itself may be relatively small in diameter. The rotor of the driving motor can be connected to the free end of the transducer 2 of the vibrator unit, or secured to the connecting body 10 at a nodal area thereof. The vibrator unit 1 may be detachably supported within the casing by means of a suitable spider 66 which also supports the energizing coil 20 in surrounding relation to the mid-section of the transducer. Suitable bearing assemblies, supported by a stationary collar 71 fixed to the supporting spider, may be provided for rotatably supporting the vibrator unit. Where a compressed air source is conveniently available, an air motor rather than an electric motor may be installed within the casing 36, with the air exhausted by the air motor used to cool the transducer during operation. Apparatus of this type may be designed to satisfy special conditions, may be used for light or medium machining operations, and is particularly adapted to simultaneously rotate and vibrate drilling, piercing, trepanning, milling and reaming tools fixed to the end of the connecting body 10.

Where medium to heavy machining, such as drilling, piercing, cutting, trepanning, milling, reaming and lapping operations are to be performed, and which require precision accuracy and sturdy construction, the vibrator unit and associated apparatus may be designed for association with an all-purpose machine structure and having means for mounting and manipulating the workpiece into various working positions, and devices for orienting, advancing, retracting and otherwise manipulating the work tool into various positions.

In heavy machining, the connecting body may be formed in separate sections 19 and 10, each having a length corresponding to one-half wavelength of sound traveling longitudinally therethrough at the frequency of vibration, and which is vibrated by a sturdy magnetostrictive transducer energized by either a stationary coil or an energizing winding 20 applied directly to the transducer, as exemplified in FIGS. 13–24. At least one of the connecting bodies is provided with a nodal flange 13 detachably secured to a rotatable inner casing 30 supporting resilient means 19d for maintaining the vibrator unit in axial alignment during rotation. The rotatable inner casing 30 can be rotatably supported by a series of bearing assemblies contained within a stationary housing 36 fixed to the supporting plate 129 of the machine structure. Where the energizing winding rotates with the transducer as exemplified in FIG. 15, a slip ring assembly associated with a rotative disc 26 fixed to the transducer and journaled in the stationary end closure 37 of the stationary outer housing 36, may be provided to transfer high frequency alternating current from an exterior source to the rotating leads of the energizing winding 20. In heavy duty machining, the transducer may be advantageously cooled by a liquid coolant introduced into a sealed chamber surrounding the transducer and supplied by a delivery tube 81 associated with the end closure, with the warmed coolant withdrawn through a convenient port 82 formed in the stationary housing. A connecting body or a series of rigidly attached connecting body sections having a combined length corresponding to an integral multiple number of half wavelengths of sound traveling therethrough at the frequency of vibration, may be provided to insure convenient tool access to deep workpiece areas to be machined.

Vibratory power

In accordance with this invention, the work tool of selected character is vibrated during rotation by a transducer motor preferably of the magnetostrictive type at a predetermined frequency selected to achieve the most efficient operation of the work tool and optimum machining of the workpiece. While an operating frequency in the sonic range and below about 15 kc. may be used, quiet operation suggests an operating frequency in the inaudible ultrasonic range of 15 kc. to 30 kc. or above. The transducer preferably has a longitudinal length which corresponds to a half wavelength of sound traveling through the material of the transducer at the frequency of operation, and when so made both ends of the transducer will longitudinally vibrate at maximum or resonance frequency, with a mode of longitudinal vibration exhibited at an intermediate area of the transducer.

Since the amplitude of vibration of the driving end of the transducer vibrating at resonance is in inverse proportion to the driving frequency, a driving frequency is selected that best serves the machining purpose as hereafter further explained. A transducer composed of magnetostrictive material such as nickel, nickel alloy, Permendur and various other alloys and materials of high tensile strength and highly magnetostrictive in character, would have a longitudinal length of approximately six inches when vibrated at about 15 kc., and a length of approximately only three to four inches when vibrated in the order of 30 kc., with the driving end having a corresponding vibration amplitude of five ten-thousandths to about one or two-thousandths of an inch. The amplitude of vibration delivered by the transducer to the connecting body of the vibrator unit, as well as the length of the transducer, must be correlated to rotative speed and other machining conditions as further explained hereafter.

Transducer coolant

Since the energizing coil as well as the transducer becomes increasingly heated when continuously operated, a suitable coolant should be conducted into surrounding relation to the transducer and energizing coil in sufficient volume to remove generated heat and thereby preserve the working life and operating efficiency of the transducer. Where miniature, light and medium machining is to be performed, a stream of air of proper volume may be supplied to the casing which surrounds the transducer by a pressurized air tube or by an air fan, whichever best accommodates the manipulating devices of the machine structure. Where heavy machining is to be performed, a water coolant is preferred which is supplied by tube 81 which enters a sealed chamber in surrounding relation to the transducer, as exemplified in FIG. 15, with suitable provision in the casing for withdrawing the warmed coolant.

Position and attachment of the work tool to the connecting body of the vibrator unit Where the machining operation is to be performed by a drilling, piercing, cutting, lapping, trepanning, milling, or reaming tool, the appropriate tool is permanently or detachably secured to the vibration output or loop end of the connecting body. In such machining operations, the longitudinal vibrations injected into the connecting body by the transducer are longitudinally injected into the base end of the tool to cause the tool to longitudinally vibrate and deliver high frequency impacts against the confrontation face of the workpiece during rotation thereof. The end face of the tool thus performs an important part of the material removing operation.

Where such tools are provided with one or more side cutting edges, as in the case of a drill or milling cutter, the side cutting edges also serve to remove workpiece material during simultaneous rotation and vibration thereof. This may be explained by the fact that the longitudinally vibrated work tool diametrically expands and contacts during each vibration, which intermittently drives the side cutting edge of the tool into and out of cutting contact with the adjacent face of the workpiece during each vibration thereof as the tool continues to rotate. This phenomena contributes in an important way to the machining operation, which cannot be attained when the tool is only rotated but not longitudinally vibrated.

When such work tools present a side cutting edge which is asymmetric to the axis of the connecting body, or where the axis of the tool is asymmetric to the longitudinal axis of the connecting body, combined longitudinal and flexural vibrations occur at the cutting edge of the tool which establishes an orbital or elliptical motion at the tool cutting edge during each vibration of the tool, which has many important values in machining which cannot be attained when the tool is only rotated and not also vibrated, Where a grinding, polishing, cutting, sawing, or reaming operation is to be performed through the agency of a circular tool, the vibrator unit and its associated apparatus should be designed to accommodate the particular shape of the workpiece and particular area of the workpiece to be thus treated; and should also be designed to be conveniently supported by a machine structure by which the circular tool, as well as the vibrator unit and driving apparatus which supports the circular tool, can be conveniently manipulated to move the circular tool into and out of engagement with the workpiece.

Where a circular tool is employed, the vibrator unit 1 and its circular tool supporting connecting body should be precisely journaled in bearing assemblies suitably supported with an elongated casing 36 or by other supporting means, which maintains the vibrator unit in precise alignment. The circular tool may be detachably fixed to the connecting body at a loop of longitudinal vibration thereof, or in the area of a node of longitudinal vibration thereof.

Where the circular tool is fixed to the longitudinally vibrating connecting body 10 at the loop end of the longitudinal vibration thereof, longitudinal vibrations are injected by the connecting body 10 axially into the circular tool, which causes the working periphery of the circular tool to be flexurally vibrated at high frequency in an axial direction, and which form of vibration during rotation may best perform certain of the machining operations.

However, when the circular tool is fixed to the connected body 10 in the area of a node of longitudinal vibration thereof, the axial component of vibration of the circular tool is minimal, but its working periphery exhibits a radial component of vibration in accordance with Poisson's ratio. When thus mounted, the working periphery of the circular tool radially expands and contracts during each high frequency vibration and during continuous rotation thereof. Highly advantageous machining results can be attained when the working periphery of the circular tool radially vibrates at high frequency during rotation thereof.

It will be appreciated, however, that when the circular tool axially vibrates or radially vibrates during simultaneous rotation thereof, that the tool must be strongly constructed to withstand high strains, and is preferably provided with a sturdy metallic core of substantial diameter to compared to the radius of its working periphery.

To insure effective cutting or material removal from the workpiece, the design and operation of the vibrator unit should be coordinated with the shape, form and position of the tool cutting edge or edges and point or points which contact or impact the workpiece during simultaneous rotation and vibration thereof.

Consideration should also be given to the design of the flutes or grooves in the work tool through which lubricants and coolants may reach the confrontation face of the workpiece, in drilling, piercing, cutting, lapping, trepanning, milling and reaming operations.

The speed of rotation, and the frequency and amplitude of vibration of the connecting body at the point at which the work tool is attached, should also take into account the composition and characteristics of the tool driven thereby, including its toughness, impact strength and its ability to maintain sharpness and eject loosened workpiece material.

When circular tools are to be rotated and simultaneously vibrated, such as circular cutting discs, circular saws and circular grinding and polishing wheels, the design and operation of the vibrator unit, including its rotative speed and the amplitude and frequency of vibration of its connecting body at the area thereof where the circular tool it attached thereto, should be coordinated with the size, shape, form, metallurgical composition, operating characteristics, strength and flexibility of the ciricular tool to be used without resultant excessive stress on the circular tool which may lead to resulting cracking, breaking and serious wear or permanent deformation of the circular tool during operation.

Recommended cutting speed

The maximum permissible peripheral speed at which machining tools can be rotated, without excessive wear and early destruction of the machine tool and damage to or deterioration of the workpiece being machined, is dependent upon a number of conditions; such as composition, molecular structure, size, diameter and form of the machine tool and its cutting edges, points and surfaces; the hardness, toughness, ductility, metallurgical and molecular structure of the workpiece to be machined, the provision for adequate lubrication and cooling, and other conditions.

In some cases, the machine tool metallurgist can determine the optimum rotative cutting speed at which a selected material may be worked when using a particular machine tool, without serious deterioration of the tool or workpiece material. In other cases the optimum cutting speed under practical machining conditions is determined experimentally by trial and error procedures. However, determined, there exists for each type of tool and each type of material to be machined, a maximum permissible or maximum optimum speed of rotation of the tool which should not be substantially execeeded.

However determined, it is the general practice of machine tool manufacturers to recommend the maximum and sometimes minimum peripheral speed at which particular tools of its manfacture can be safely and most advantageously rotated when machining specified workpiece materials, and which also takes into account the recommended rate and depth of penetration of the working edges, points or surface of the particular tool into the particular workpiece materials. These recommendations, which the tool manufacturer extends to the user of its tools, are supplied in the form of charts, tables, formulae and examples, and are generally referred to in the art, with respect to a particular tool and a particular workpiece material, as "recommended cutting speed." "The recommended cutting speed" may be represented by a vector $\overline{V}_c$ which is tangent to a circle whose diameter corresponds to the diameter of the tool to be used, and which is determined by the peripheral speed of the tool.

Frequency and amplitude of vibration of the simultaneously rotated work tool

When high frequency vibrations are also introduced at the cutting edge or point of the tool and which impacts the confrontation face of the workpiece during each vibration cycle, a time varying component of vibration velocity $\overline{V}$ is superimposed on the linear velocity, $\overline{V}_L$, of te cutting edge or point, attributable to the rotation alone.

Thus, the actual confrontation of the cutting edge or point with the work surface displays a resultant cutting velocity vector, $\overline{V}_R$, which is, at any instant, the vector sum of the vectors, $\overline{V}$, and $\overline{V}_L$.

To attain the most effective machining, the production of precisely dimensioned and finished workpieces, and the preservation of the useful life of the work tool, requires that the resultant velocity vector, $\overline{V}_{R'}$ not materially exceed the recommended cutting speed vector, $\overline{V}_{C'}$ attributable to rotation alone, It will doubtless be noted that the resultant velocity vector, $\overline{V}_{R'}$ varies in magnitude between two extreme values, which are determined by the two extreme values of the vibration velocity vector, $\overline{V}$. It will be further evident that the above recommendation preferably places the recommended cutting speed vector, $\overline{V}_{C'}$ in the magnitude range of the resultant vector, $\overline{V}_R$. The vibration velocity vector, $\overline{V}$, is determined by $2\pi$ times the frequency of vibration multiplied by the amplitude of vibration and is determined in direction by the direction of the vibration displacement at any instant at the point or edge in question.

In accordance with this invention, the connecting body 10 of the vibrator unit is designed to operate as an amplitude modifying acoustical impedance transformer so that the amplitude of vibration of the working edge or point of the work tool multiplied by $2\pi$ times the frequency of vibration produces the vibration velocity factor $\bar{V}$ which when combined with the above mentioned linear velocity vector $\bar{V}_L$, produces a resultant velocity vector, $\bar{V}_R$, which should be substantially equal in magnitude to the rotative factor or recommended cutting speed $\bar{V}_C$. The connecting bodies associated with the vibrator unit and driving apparatus of this invention, are so designed and formed as to increase the amplitude of vibration, or reduce the amplitude of vibration, transmitted by the transducer to the vibration input end of the connecting body and thence delivered at reduced and increased amplitude at the loop end or nodal area of the connecting body. There the work tool is attached. For example, by making the vibration input section of the connecting body or transformer of larger mass than the tool supporting output section thereof, the amplitude of vibration can be materially increased; and by making the vibration input section of the connecting body of smaller mass than the tool supporting output section thereof, the amplitude of vibration may be decreased, as explained in Patent Re. 25,033.

Thus, by selecting a frequency of operation and designing the half wavelength transducer to vibrate at resonance at the selected frequency; and also designing the connecting body to deliver to the work tool attached thereto a predetermined increased or decreased amplitude of vibration, a vibration velocity factor $\bar{V}$ can be designed into the vibrator unit which takes into account the recommended cutting speed and the rotative speed of the tool, with resultant optimum conditions of operation.

Since the amplitude of vibration of the working point, cutting edge or working surface of the selected work tool is the determining factor in the selection of a vibration velocity, the length, shape, form and diameter of the tool itself should be considered as a part of the connecting body to which it is attached. Also, where the tool is removably attached to the connecting body, a rigid connecting joint between the connecting body and work tool should be made. Where the work tool is subjected to considerable wear and requires frequent replacement, it may be advantageous to integrally secure the work tool to the connecting body by welding or bonding procedure, with provision made for convenient removal and re-application of the entire vibrator unit from the associated supporting casing or rotative means, as exemplified in the drawings and heretofore described. Convenient removal of the vibrator unit, normally designed to vibrate a particular work tool at a predetermined frequency and amplitude of vibration, suggests that a substitute vibrator unit designed for the particular work tool, be used.

High frequency vibration of a simultaneously rotated work tool has several important effects and advantages. One important advantage flows from the friction reducing action which arises when the cutting edge or point of the tool separates from the work during each vibration cycle, and which introduces an ultrasonic pumping action. This pumping action insures transmission of the cutting fluid, lubricant or coolant to all areas of the workpiece area where material is being removed, and which far surpasses the coolant efficiency attainable in tool designs which only rotate, such as the provision of various forms of grooves for coolants on the tool. The adequate supply of cutting fluid or coolants to the work area remains a major problem in rotary machining, since the cutting edge or point of the tool which only rotates remains in contact with the work surface during the entire period when cutting proceeds. Where the work tool is vibrated as well as rotated, the cutting fluid or coolant is pumped with great force into contact with the work site and pumped out with the removed material, which results in improved surface finishes and enhanced machining speeds.

Additionally, friction reduction due to separation of the work tool from the work area during each cycle of vibration, also allows a rest period for the tool with the resultant reduced wear on the tool. Additionally, substantially reduced rotative power is required when the rotated tool is simultaneously vibrated. These combined advantages result in superior surface finishes when machining hard materials, greater precision accuracy in machining with minimum rejects, greatly increased machining speeds and increased tool life.

While certain novel features of this invention have been disclosed herein and are pointed out in the claim, it will be understood that various omissions, substitutions and changes may be made by those skilled in the art, without departing from the spirit of this invention.

What is claimed is:

1. Apparatus for rotating and simultaneously vibrating at high frequency a work performing tool element which includes; a vibrator unit presenting a magnetostrictive transducer having a longitudinal length corresponding to one-half wavelength of sound traveling longitudinally through the material thereof at the frequency of vibration, a vibration transmitting and tool supporting connecting body fixed at one end thereof to one end of said transducer and having a longitudinal length corresponding to integral half wave multiples of sound traveling longitudinally through the material of the connecting body at the frequency of vibration injected into said connecting body by said transducer when energized, and a supporting flange fixed to and extending laterally from said connecting body in the area of a node of longitudinal vibration thereof; a tubular casing extending from said supporting flange and into surrounding relation to at least a portion of said transducer, means for securing said supporting flange to said tubular casing, means adjacent said supporting flange for rotating said casing and vibrator unit, a resilient radial vibration absorbing component positioned between said rotatable casing and said vibrator unit at a nodal area thereof to thereby brace said vibrator unit during rotation, a housing in surrounding relation to said casing and extending beyond the free end of said transducer, means for supporting said housing, bearing assemblies positioned between said casing and housing for rotatably supporting said casing and vibrator unit, a closure cap adjacent the free end of said transducer and supported by said casing, an energizing winding surrounding the mid-section of said transducer and rotatable therewith, a nonconductive contact disc in alignment with said vibrator unit and rotatably supported by said closure disc, a slip ring assembly associated with said closure cap and contact disc forming a part of the power leads extending from said energizing winding to an external source of high frequency alternating current, a transducer coolant supply tube extending through said closure cap, and a warmed coolant withdrawal port in the tubular wall of said housing.

References Cited

UNITED STATES PATENTS

| | | | |
|---|---|---|---|
| 2,792,674 | 5/1957 | Balamuth et al. | 310—26 XR |
| 2,804,725 | 9/1957 | Dench | 51—64 |
| 2,818,686 | 1/1958 | Weiss | 51—59 XR |
| 2,939,251 | 6/1960 | Greening | 51—34 |
| 2,991,594 | 7/1961 | Brown et al. | 310—26 XR |
| 3,015,914 | 1/1962 | Roney | 51—56 |

MILTON O. HIRSHFIELD, Primary Examiner

D. F. DUGGAN, Assistant Examiner

U.S. Cl. X.R.

51—59